_United States Patent_ [19]

Thorning

[11] 4,047,321

[45] Sept. 13, 1977

[54] ANIMAL TRAP

[76] Inventor: Lloyd Carl Thorning, 115 Coleman Avenue, Toronto, Ontario, Canada, M4C 1P9

[21] Appl. No.: 741,985

[22] Filed: Nov. 15, 1976

Related U.S. Application Data

[63] Continuation of Ser. No. 658,738, Feb. 17, 1976, abandoned.

[30] Foreign Application Priority Data

Mar. 13, 1975 United Kingdom ............... 10588/75

[51] Int. Cl.² ............................................. A01M 23/30
[52] U.S. Cl. ......................................................... 43/78
[58] Field of Search ....................................... 43/78, 77

[56] References Cited

U.S. PATENT DOCUMENTS

| | | | |
|---|---|---|---|
| 1,147,822 | 7/1915 | Smith | 43/78 |
| 2,446,687 | 8/1948 | Billings | 43/78 |

Primary Examiner—Louis G. Mancene
Assistant Examiner—Daniel J. Leach
Attorney, Agent, or Firm—Ridout & Maybee

[57] ABSTRACT

There is provided an animal trap comprising a spiral spring which has a fixed inner end portion and a movable outer end portion and which is extendible to a stressed condition wherein the movable outer end portion of the spring is in engagement with support faces presented by the outer ends of two pivotally interconnected levers, these support faces being vertically above pivotal connections between the outer ends of the levers and links which are pivotally connected to a frame of the trap. With the spring in this stressed condition thereof a bait holder is disposed within the coils of the spring so that when an animal attempts operatively to gain access to bait on the bait holder the bait holder is tilted to contact either directly or indirectly one or both of the levers with resultant upward movement of the pivotal connection between the levers, the substantially vertically downward forces exerted by the outer end portion of the spring on the support faces causing the levers, when in this position, to pivot with a snap action to a position in which the support faces release the outer end portion of the spring as a result of the inward movement of these support faces. The animal in question is killed as the spring returns to its inert or out-of-use condition by the shearing action of the appropriate adjacent coils of the spring on the neck of the animal. Since with the spring in its stressed condition the spacing between the adjacent coils of the spring increases progressively from the fixed inner end portion to the outer end portion of the spring and since the distance between the coils of the spring and the bait holder likewise increases progressively from the fixed inner end portion to the outer end portion of the spring the trap can be used to kill in the same humane manner a variety of animals within a predetermined range of sizes.

21 Claims, 9 Drawing Figures

ANIMAL TRAP

This is a continuation, of application Ser. No. 658,738, filed Feb. 17, 1976, now abandoned.

This invention is concerned with an animal trap by means of which animals such as, for example, wolves or beavers or smaller animals such as mice may be killed.

Various forms of such a trap have of course hitherto been proposed, reference in this connection being made to, for example, the forms of trap disclosed and claimed in U.S. Pat. Nos. 2,446,687 which issued on Aug. 10, 1948 to E.E. Billings and 1,147,822 which issued on July 27, 1915 to A.J. Smith. It is, however, a disadvantage of the forms of trap according to these prior United States patents and of all other hitherto proposed forms of trap of which the applicant is aware that each of these traps depending on the specific dimensions and other characteristics thereof is specifically suited for killing animals of substantially only a specific size, and while hitherto proposed forms of trap may trap or even kill animals of a size other than the size for which the traps are specifically intended there is a likelihood that in so doing they will kill such animals in a relatively inhumane manner thereby causing unnecessary suffering to the animals in question.

It is accordingly a primary object of the present invention to provide an improved form of animal trap in which the above-described disadvantage is substantially obviated or mitigated in that a trap of specific dimensions and other characteristics according to the present invention will operatively kill animals within a predetermined range of sizes with all such animals being so killed in substantially the same, relatively humane manner.

An animal trap according to the present invention comprises a spiral spring having a fixed inner end portion and a movable outer end portion, the spring having a plurality of coils and being extendible to a stressed condition thereof, a movable bait holder which is so mounted as to be within the coils of the spring when the spring is in said stressed condition thereof, a support with which said outer end portion of the spring is engageable when in said stressed condition thereof to retain the spring in said stressed condition thereof, and a linkage mechanism through which the bait holder is engageable with the support. The linkage mechanism is operable, by movement of the bait holder under the influence of an animal attempting to remove bait from the bait holder, to move the support for release of said outer end portion of the spring therefrom with resultant retraction of the spring from its stressed condition during which adjacent coils of the spring between which the neck of the animal is disposed exert a shearing action on the neck of the animal to kill the animal.

In order that the invention may be more clearly understood and more readily carried into effect the same will now, by way of example, be more fully described with reference to the accompanying drawings in which FIG. 1 is a view, partly broken away for clarity, of an animal trap according to a preferred embodiment of the invention;

Figure 1:
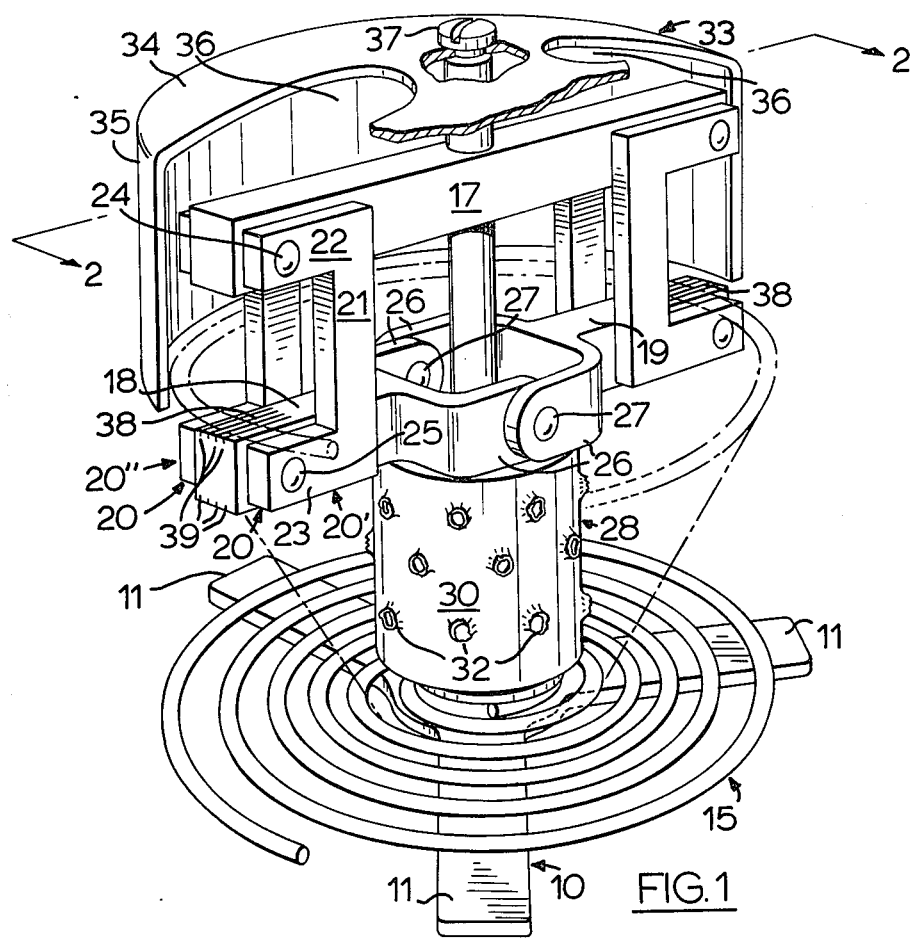
Figure 2:
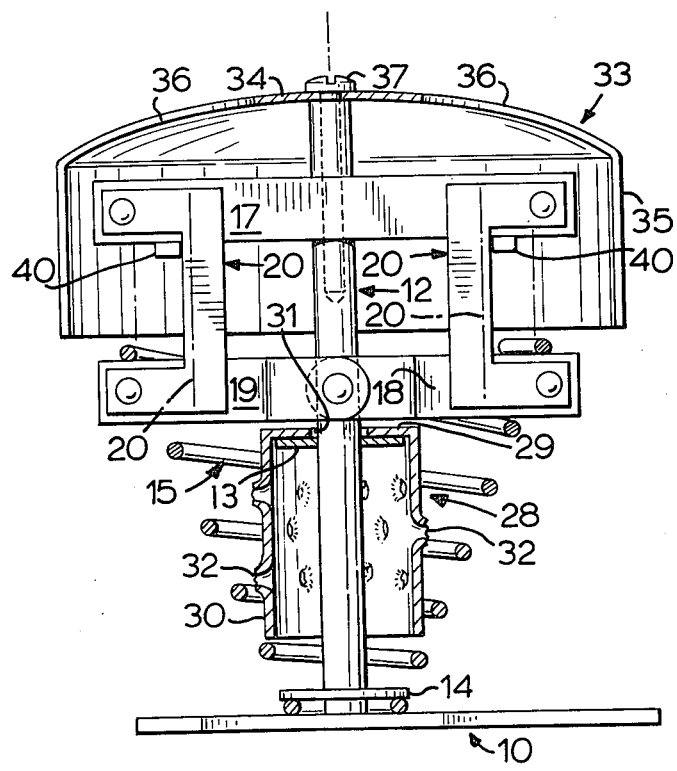
FIG. 2 is a side, axially sectioned view of the trap shown in FIG. 1 on the line 2—2 thereof, with the trap shown in a different condition.
Figure 3:
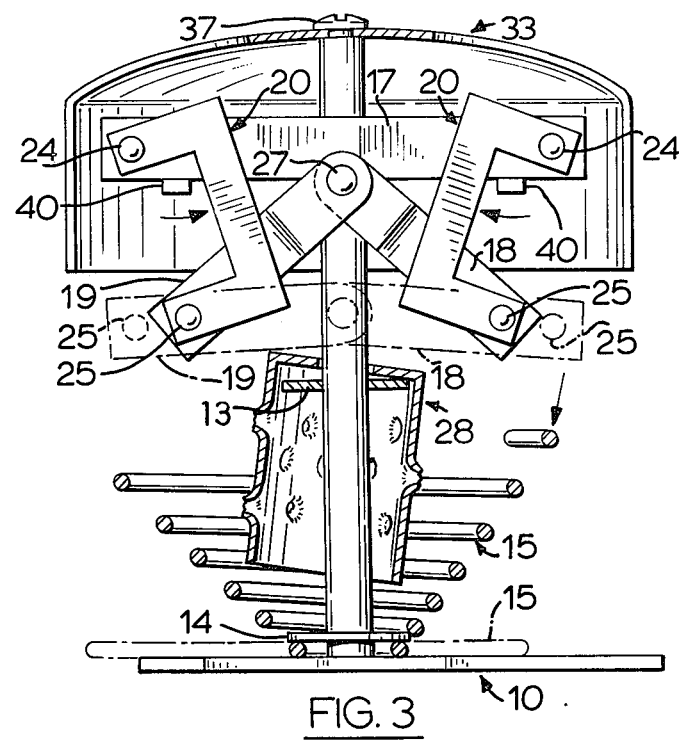
FIG. 3 is a view generally corresponding to FIG. 2 but showing a still different condition of the trap.

Referring to the drawings and in particular to FIGS. 1 - 3 thereof, 10 denotes generally a base member which in the embodiments shown in the drawings incorporates three equi-angularly spaced leg portions 11. It is to be understood, however, that the form of the base member 10 is in no way critical to the present invention, and in alternative embodiments (not shown) of the invention this base member could, for example, be consititued by a spike or the like which is operatively driven into the ground to support the trap.

An upwardly directed stem member 12 is mounted with the lower end thereof removable secured to the base member 10 centrally thereof, the stem member 12 being provided between the ends thereof with a collar 13 which is secured to the stem member 12. A further collar 14 is secured on the lower end portion of the stem member 12 with the inner end portion of a spiral spring 15 being fixedly clamped between this collar 14 and the base member 10.

While as shown in the accompanying drawings there is of course a specific number of coils constituting the plurality of coils of the spring 15 it is to be understood that there may be a greater or lesser number of coils constituting the plurality of coils of the spring 15.

17 denotes a horizontally disposed arm which is secured to the upper end portion of the stem member 12 and which is symmetrically disposed relative thereto, this arm 17 together with the base member 10 and the stem member 12 constituting a frame of the trap.

Depending from the arm 17 is a linkage mechanism which comprises two levers 18 and 19, and two links 20 each of which is constituted by two parts 20' and 20" with the parts 20' being disposed on one side of the arm 17 and the levers 18, 19 and with the parts 20" being disposed on the opposite side of the arm 17 and the levers 18, 19. The parts 20' and 20" of the links 20 are all identical, each said part 20' and 20" being U-shaped and comprising a web portion 21 and two spaced, parallel limb portions 22 and 23, with the free ends of the limb portions 22 of the parts 20', 20" of one of the links 20 being pivotally connected by a pivot pin 24 to one of the end portions of the arm 17 and with the free ends of the limb portions 23 of the parts 20', 20" of said one of the links 20 being pivotally connected by a pivot pin 25 to an outer end of the lever 18. Likewise, the free ends of the limb portions 22 and the free ends of the limb portions 23 of the parts 20', 20" of the other of the links 20 are pivotally connected by pivot pins 24 and 25, respectively, to the other of the end portions of the arm 17 and to an outer end of the lever 19, respectively, the links 20 being symmetrically disposed relative to the stem member 12.

In the preferred embodiment of the invention shown in FIGS. 1 - 3 of the drawings, the inner end of each of the levers 18 and 19 is of bifurcated form presenting two spaced parallel limb portions 26, the limb portions 26 of the inner end of the lever 18 being disposed inwardly of the limb portions 26 of the inner end of the lever 19 with the limb portions 26 of the inner end of the lever 18 being pivotally connected by axially aligned pivot pins 27 to the respective adjacent limb portions 26 of the inner end of the lever 19, so that these inner ends of the levers 18 and 19 are thus pivotally interconnected.

A bait holder which is denoted generally by the reference numeral 28 is mounted on the frame, this bait holder 28 which is of generally inverted cup form comprising an upper wall 29 and a depending skirt portion 30. The upper wall 29 of the bait holder 28 is centrally provided with an opening 31 through which the stem member 12 is disposed as a clearance fit, the part of the upper wall 29 surrounding this opening 31 being supported on the collar 13. Because of the clearance fit of the stem member 12 through the opening 31 and the thin nature of the collar 13, the bait holder 28 may be tiltably moved as is hereinafter more fully described with particular reference to FIG. 3.

The skirt portion 30 of the bait holder 28 is provided with a plurality of outwardly projecting annular teeth 32 which may be formed by, for example, lancing holes in this skirt portion 30, bait which may be constituted by any suitable form of bait such as, for example, pieces of cheese where the animal trap is for killing mice or pieces of meat where the animal trap is for killing wolves, being operatively impaled on the outwardly projecting angular teeth 32 as is hereinafter more fully described. It will of course be understood that in alternative embodiments (not shown) the skirt portion 30 of the bait holder 28 may be provided with, for example, outwardly projecting spikes instead of the annular teeth 32, these spikes serving however the same function as the annular teeth 32.

A cover member which is denoted generally by the reference numeral 33 is preferably mounted on the frame, this cover member 33 comprising an upper portion 34 which is of domed form and which extends substantially over the upper portion of the trap, and a skirt portion 35 which extends substantially around the upper portion of the trap from the upper portion 34 substantially to the level of the upper faces of the levers 18, 19. As is shown most clearly in FIG. 1 of the drawings, the cover member 33 is provided with two diametrically opposed radial slots 36 which are in alignment with the levers 18, 19 and the arm 17, these slots 36, the purpose of which is hereinafter more fully described, extending across the skirt portion 35 and across the upper portion 34 of the cover member 33 to positions spaced a short distance from the center thereof. The mounting of the cover member 33 of the frame may be by means of a screw-threaded member 37 which is disposed through the center of the upper portion 34 of the cover member 33 and which is screw-threadedly engaged within the upper end portion of the stem member 12.

In alternative embodiments (not shown) of the invention the cover member 33 may be provided with suspension means by which the trap when in use may operatively be suspended from, for example, a branch of a tree. Where the trap is intended to be used in this manner the leg portions 11 of the base member 10 may of course be omitted.

In operation, the animal trap is disposed at the desired location with the trap being supported on the ground or the like by the base member 10 or being suspended by the suspension means as hereinbefore described. With the spring 15 initially in the inert or out-of-use condition shown in full lines in FIG. 1 bait the nature of which depends on the type of animal which it is desired to kill with the trap as is hereinbefore described, is impaled on some or all of the outwardly projecting annular teeth 32 presented by the bait holder 28. The outer end portion of the spring 15 is then raised and is disposed in supported contact with support faces 38 presented by the levers 18 and 19, these support faces 38 being constituted more particularly by the upper faces of the outer ends of the levers 18 and 19. The support faces 36 which together thus constitute a support for the engagement of the outer end portion of the spring 15 when the spring 15 is in the stressed condition thereof are in substantially vertical alignment with the pivot pins 25, so that with the spring 15 in this stressed condition thereof the outer end portion of the spring 15 is substantially vertically above the pivot pins 25 as is most clearly shown in FIG. 2, and the spring 15 is thereby retained in this stressed condition thereof. With the spring in this stressed condition thereof, which is also partially shown in chain-dotted lines in FIG. 1, the animal trap is "set", the support faces 38 preferably being provided with grooves 39 so that the portions of the support faces 38 between these grooves 39 constitute ridges which extend in the direction between the inner and outer ends of the levers 18 and 19 and hence transversely to the outer end portion of the spring 15 when the spring 15 is in the stressed condition thereof and which tend to prevent any inadvertent turning of the spring 15 about its axis. As will be appreciated, any such turning of the spring 15 about its axis could result in premature release of the outer end portion of the spring 15 from the support faces 38.

Unless of course the force required on the outer end portion of the spring 15 is of too great a magnitude the above-described raising of the outer end portion of the spring 15 to dispose the animal trap in the set condition thereof may be performed manually be disposing one's thumbs through the slots 36 in the cover member 33 and against the upper face of the arm 17 in order to provide the necessary reaction force and then raising the outer end portion of the spring 15 by means of one's remaining fingers. If, however, the cover member 33 is of sufficient strength and is sufficiently securely mounted on the frame the slots 36 may be omitted with one's thumbs being disposed on top of the upper portion 34 of the cover member 33 during the raising of the outer end portion of the spring 15 as hereinbefore described.

When, with the trap disposed in the set condition as hereinbefore described, an animal subsequently approaches the trap it inserts its head between the appropriate coils of the spring 15 in order to gain access to the bait which is impaled on the outwardly projecting annular teeth 32 of the bait holder 28, the bait holder 28 being of course within the coils of the spring 15 when the trap is in said set condition. In attempting to remove the bait from the bait holder 28 the bait holder 28 which is of relatively light weight construction and may be formed of, for example, aluminum is almost inevitably moved, and more particularly tiltably moved in the manner shown in FIG. 3. This movement of the bait holder 28 causes the bait holder 28 directly to contact and raise the inner end of one or both of the levers 18 and 19, so that the pivotal interconnection constituted by the pivot pins 27 between the inner ends of the levers 18 and 19 is slightly raised, as is shown in chain-dotted lines in FIG. 3. With the levers 18 and 19 in this condition it will be appreciated that the downward forces exerted by the outer end portion of the spring 15 on the support faces 38 are disposed outwardly of the axes of the pivot pins 25 so that the levers 18 and 19 are moved by a snap action to the condition shown in full lines in FIG. 3, with of course resultant pivoting movement of the links 20. This movement of the levers 18 and 19 results in the outer end portion of the spring 15 being released from the support faces 38 so that the spring 15 returns substantially instantaneously from its stressed condition towards its inert or out-of-use condition. In so doing the adjacent coils of the spring 15 between which the animal's neck is disposed exert a shearing action on the animal's neck which causes the animal's neck to be broken or which causes strangulation of the animal. Thus, an animal trap according to the present invention provides an extremely humane manner for killing animals of the type for which the trap is intended.

When the trap is in the set condition thereof the cover member 33 substantially prevents an animal from gaining access to the bait holder 28 other than between adjacent coils of the spring 15, and also prevents an animal from "triggering" the trap by, for example, directly moving one of the links 20.

It will be noted, particularly from FIG. 2 of the drawings, that it is an inherent characteristic of the spiral spring 15 that, when the spring 15 is in the stressed condition thereof, the vertical spacing between the adjacent coils of the spring 15 progressively increases from said spacing adjacent to the inner end portion of the spring 15 to said spacing adjacent to the outer end of said spring 15. Furthermore, the distance between the adjacent coils of the spring 15 and the bait holder 28 progressively increases from the inner end portion of the spring 15 to the outer end portion thereof. Since, of course, smaller animals will naturally tend in attempting to gain access to the bait on the bait holder 28 to dispose their heads between coils of the spring 15 adjacent to the inner end portion thereof whereas larger animals will naturally tend in attempting to gain access to the bait on the bait holder 28 to dispose their heads between coils of the spring 15 adjacent to the outer end portion thereof and since of course smaller animals tend to have shorter heads than larger animals, it follows that by selecting a spring of appropriate dimensions a particular trap according to the present invention can be used for killing animals over a predetermined range of sizes with each animal within this range being operatively killed in substantially the same humane manner, namely, by a shearing action on the neck of the animal as is hereinbefore described. Furthermore, smaller animals in attempting to remove the bait from the bait holder 28 will or course exert a force on the bait holder 28, which tends tiltably to move the bait holder 28 as hereinbefore described, at a lower position on the skirt portion 30 of the bait holder 28 than larger animals, so that this force exerted by smaller animals is at a greater moment arm than the corresponding force exerted by larger animals, in relation to the above-mentioned tiltable movement of the bait holder 28 on the collar 13. This feature is of significance in that generally the said force exerted by smaller animals will be less than that exerted by larger animals, and substantially ensures that the bait holder 28 is tiltably moved as hereinbefore described by any animal within the range of sizes thereof for which the trap is intended.

It will also be noted that it is a further feature of an animal trap according to the preferred embodiment of the invention as hereinbefore described, that the trap is operative no matter from which direction the animal in question may approach the trap and attempt to gain access to the bait on the bait holder 28. In addition the precise location on the support faces 38 of the parts of the outer end portion of the spring 15 which are in supported contact with the support faces 38 when the trap is in the set condition may be slightly varied with a resultant adjustment in the sensitivity of the trap to the triggering thereof by turning of the spring 15 relative to the remainder of the trap. Also the tension in the spring 15 when the trap is in the set condition thereof may be varied by vertically adjusting, relative to the stem member 12, the location of the arm 17, the linkage mechanism comprising the levers 18 and 19 and the links 20, and the collar 13 and bait holder 28.

It will be noted particularly from FIG. 3 of the accompanying drawings in which the spring 15 is shown in chain-dotted lines in its inert or out-of-use condition that with the spring 15 in this condition the axis thereof is preferably somewhat offset relative to the axis of the stem member 12. It has been found that if the support faces 38 presented by the levers 18 and 19 are, when the spiral srping 15 is in its inert or out-of-use condition, exactly vertically above the parts of the outer end portion of the spring 15 which are disposed in supported contact with these support faces 38 when the trap is in the set condition thereof so that during the setting of the trap said parts of the outer end portion of the spring 15 are raised vertically for disposition in supported contact with the support faces 38 there is a tendency, when the trap is in the set condition thereof, for the levers 18 and 19 to be slightly laterally offset in the direction towards the part of the outer end portion of the spring 15 which is in supported contact with the support face 38 presented by the lever 18 i.e. to the right as viewed in FIG. 2. It is believed that this results from the downward force exerted by the appropriate part of the outer end portion of the spring 15 on the support face 38 presented by the lever 19 being greater than the corresponding downward force exerted by the appropriate part of the outer end portion of the spring 15 on the support face 38 presented by the lever 18, and in any event the above-mentioned offsetting which is shown for clarity in an exaggerated manner is provided such that when the outer end portion of the spring 15 is raised into supported contact with the support faces 38 during the setting of the trap this outer end portion of the spring 15 may slightly move laterally in the above-described direction so that there is then no tendency for the levers 18 and 19 to be moved laterally under the influence of the outer end portion of the spring 15 on the support faces 38, the parts of the outer end portion of the spring 15 which are then in supported contact with the support faces 38 being substantially equi-distantly spaced from the axis of the stem member 12, with the pivot pins 25 disposed vertically below the pivot pins 24.

While the links 20 operatively pivot inwardly about the pivot pins 24 during the triggering of the trap as is shown in FIG. 3 it will be appreciated that these links 20 are not intended to pivot outwardly about the pivot pins 24 from the positions thereof shown in, for example, FIG. 2, and positively to prevent any such outward pivoting of the links 20 there may be provided stop members 40 fixedly mounted on the underside of the arm 17.

Furthermore, in order to provide for location of the outer end portion of the spring 15 at the correct positions on the support faces 38 during the setting of the trap the web portions 21 of the parts 20' and 20'' of the links 20 may be so located that with the outer end portion of the spring 15 in contact therewith this outer end portion of the spring 15 is correctly positioned on the support faces 38. This modified form of the trap is shown in FIG. 2 wherein the modified position of links 20 is shown in chain-dotted lines.

Figure 6:
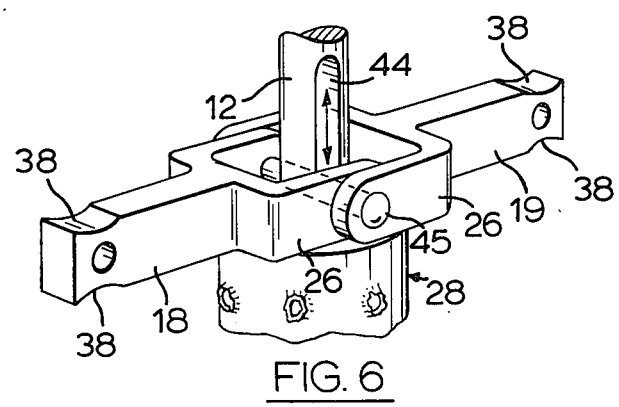

Alternatively, to ensure that during the setting of the trap the outer end portion of the spring 15 is correctly positioned on the support faces 38, these support faces 38 may be presented by notches 41 (FIG. 4) formed in the outer ends of the levers 18 and 19 so that each support face 38 is inwardly bounded by an abutment against which the outer end portion of the spring 15 contacts when the trap is in the set condition thereby to prevent excessive inward movement of the outer end portion of the spring 15. A further alternative embodiment for ensuring that during the setting of the trap the outer end portion of the spring 15 is correctly positioned on the support faces 38 is shown in FIG. 6 in which it will be noted that these support faces 38 are each concave in the direction between the inner and outer ends of the respective lever 18 or 19, so that the outer end portion of the spring 15 is positioned in the bottom of the concave support faces 38 when the trap is set.

Figure 4:
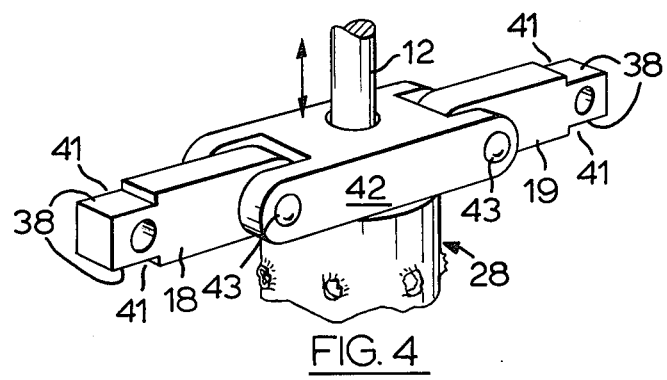
FIGS. 4, 5, 6 and 7 are views of a portion of the trap shown in FIGS. 1 - 3 according to alternative embodiments of the invention.
Figure 5:
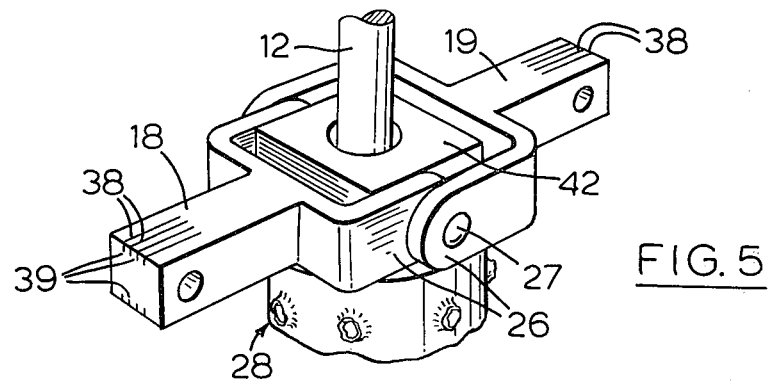

In FIG. 4 there is also shown a pivotal interconnection between the inner ends of the levers 18 and 19 according to an alternative embodiment of the invention. In this alternative embodiment there is provided a block 42 which is slidably mounted on the stem member 12, the inner ends of the levers 18 and 19 being pivotally connected by spaced parallel pivot pins 43 to the block 42, although in the alternative embodiment shown in FIG. 5 the inner ends of the levers 18 and 19 are of bifurcated form presenting limb portions corresponding to the limb portions 26 of the embodiment hereinbefore described with reference to FIGS. 1 - 3, with pivot pins corresponding to the pivot pins 27 pivotally interconnecting the limb portions 26 of the inner ends of the levers 18 and 19 in the manner hereinbefore described with reference to FIGS. 1 - 3 and being connected to the block 42. In FIG. 6 there is shown a further alternative embodiment of the pivotal interconnection between the inner ends of the levers 18 and 19. This further alternative embodiment corresponds to the embodiment hereinbefore described with reference to FIGS. 1 - 3 except that the stem member 12 is provided with a vertically elongated slot 44 and the pivot pins 27 of the embodiment shown in FIGS. 1 - 3 are replaced by a single pivot pin 45 which is disposed freely through the slot 44.

Figure 7:
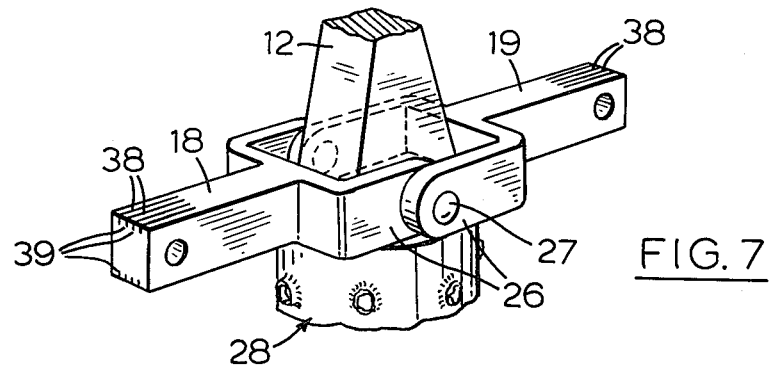

The alternative embodiment of the invention shown in FIG. 7 differs from that hereinbefore described with reference to FIGS. 1 - 3 in that instead of both limb portions 26 of the inner end of the lever 18 being disposed inwardly of the limb portions 26 of the inner end of the lever 19 only one of limb portions 26 of the inner end of the lever 18 is disposed inwardly of the adjacent limb portion 26 of the inner end of lever 19 with the other limb portions 26 of the inner end of the lever 18 being disposed outwardly of the adjacent limb portion 26 of the inner end of the lever 19. This feature has the advantage that the levers 18 and 19 may be identical, as shown in FIG. 7. This alternative embodiment shown in FIG. 7 also differs from that hereinbefore described with reference to FIGS. 1 - 3 in that the portion of the stem member 12 which is between the inner ends of the levers 18 and 19 as the levers 18 and 19 move between the position thereof when the animal trap is in its set condition (FIG. 2) and the position thereof when the trap is in its triggered condition (FIG. 3) is upwardly tapered in the vertical plane containing the levers 18 and 19, this tapering being such as to guide the inner ends of the levers 18 and 19 during said movement thereof. Said portion of the stem member 12 may also be upwardly tapered in the vertical plane at right angles to the vertical plane containing the levers 18 and 19 by, for example, said portion of the stem member 12 being of frusto-conical form, although in this case said portion of the stem member 12 would not of course serve to guide the inner ends of the levers 18 and 19 in the vertical plane at right angles to the vertical plane containing the levers 18 and 19 during said movement of the levers 18 and 19.

Figure 8:
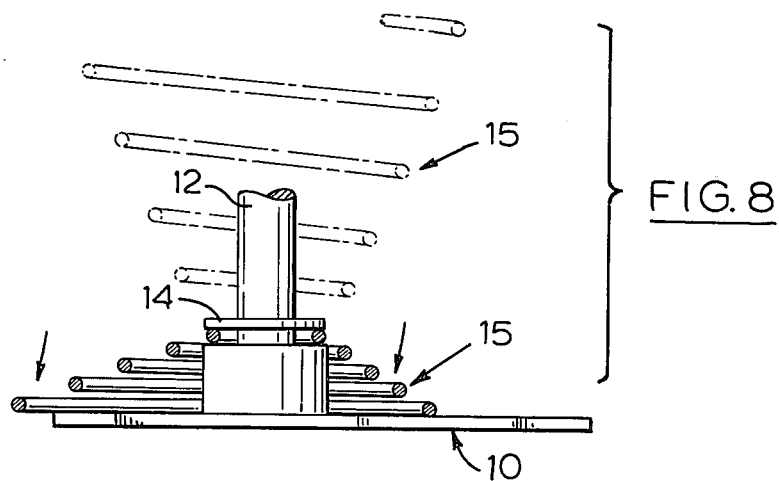
FIGS. 8 and 9 are views of a different portion of the trap shown in FIGS. 1 - 3 according to further alternative embodiments of the invention.

The alternative embodiment of the invention shown in FIG. 8 differs from the embodiment hereinbefore described with reference to FIGS. 1 - 3 in that when the spring 15 is in the inert or out-of-use condition, as shown in full lines in FIG. 8, the outer end portion of the spring 15 is disposed to the side of the plane containing the inner end portion of the spring 15 opposite that to which the outer end portion is disposed when the spring 15 is in the stressed condition thereof. This embodiment is advantageous in that during the killing of an animal there is an increased shearing effect on the neck of the animal, although it will be noted that if in this alternative embodiment shown in FIG. 8 the spring 15 is reversed the above-mentioned advantage of this embodiment shown in FIG. 8 is no longer achieved whereas in the embodiment of the invention hereinbefore described with reference to FIGS. 1 - 3 the spring 15 may be reversed without affecting the operation of the trap.

It will also be noted that in the preferred embodiment of the invention as hereinbefore described with reference to FIGS. 1 - 3 the levers 18 and 19, the links 20 and the arm 17 are all reversible in the sense that they can be used in an upside-down condition, and for this reason support faces 38 are also provided on the lower faces of the outer ends of the levers 18 and 19. This feature is advantageous in that if, for example, the support faces 38 on the upper faces of the outer ends of the levers 18 and 19 become damaged these levers 18 and 19 can simply be reversed and re-used.

Figure 9:
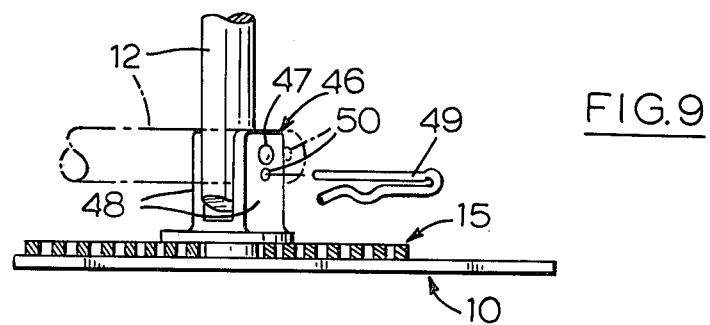

Referring to FIG. 9, the base member 10 is secured to a U-shaped bracket 46 with the inner end portion of the spring 15 being securely clamped between the base of this bracket 46 and the base member 10, and the stem member 12 is pivotally connected about a pivot pin 47 between the limbs 48 of the bracket 46. When the stem member 12 is in the condition shown in full lines in FIG. 9 it is operatively locked in this position by disposing a split pin 49 through aligned holes 50 in the limbs 48 of the bracket 46 and in the stem member 12, but by removing this split pin 49 the stem member 12 may be pivotally moved to the position shown in chain-dotted lines thereby to "collapse" the animal trap for facilitating the carrying thereof.

As is also shown in FIG. 9 the coils of the spring 15 may be in substantially contiguous relationship when the spring 15 is in the inert or out-of-use condition thereof in which it is shown in FIG. 9, with each coil of the spring 15 being of rectangular form, such as for example square form, in transverse cross-section. With such a spring 15 there is operatively an improved shearing action on the neck of the animal in question during the operative killing of the animal by the trap.

It will of course be understood that many of the features of the embodiments as hereinbefore described with reference to the accompanying drawings may be incorporated together in an animal trap according to the present invention. Thus, solely by way of example, the feature hereinbefore described with reference to FIG. 4 and comprising the block 42 may be incorporated with the feature hereinbefore described with reference to FIG. 8 in an animal trap according to the invention, and the feature hereinbefore described with reference to FIG. 6 and comprising the single pivot pin 45 disposed through the slot 44 may be incorporated with the feature hereinbefore described with reference to FIG. 9 and comprising the lockable pivotal connection between the base member 10 and the stem member 12 in an animal trap according to the invention.

What I claim as my invention is:

1. An animal trap comprising a spiral spring having a fixed inner end portion and a movable outer end portion the spring having a plurality of coils and being extendible to a stressed condition thereof, a movable bait holder which is so mounted as to be within the coils of the spring when the spring is in said stressed condition thereof, a support with which said outer end portion of the spring is engageable when in said stressed condition thereof to retain the spring in said stressed condition thereof, and a linkage mechanism through which the bait holder is engageable with the support, the linkage mechanism being operable, by movement of the bait holder under the influence of an animal attempting to remove bait from the bait holder, to move the support for release of said outer end portion of the spring therefrom with resultant retraction of the spring from its stressed condition during which adjacent coils of the spring between which the neck of the animal is disposed exert a shearing action on the neck of the animal to kill the animal.

2. An animal trap according to claim 1, wherein said coils of the spring are in substantially contiguous relationship when the spring is in an inert condition thereof.

3. An animal trap according to claim 2, wherein each coil of the spring is of rectangular form in transverse cross-section.

4. An animal trap according to claim 1, wherein the spring has an inert condition thereof in which the outer end portion of the spring is disposed to the side of the plane containing the inner end portion of the spring opposite that to which it is disposed when the spring is in said stressed condition thereof.

5. An animal trap according to claim 1, wherein the bait holder is tiltably movable.

6. An animal trap comprising a frame, a spiral spring having an inner end portion fixed to the frame and a movable outer end portion, the spring having a plurality of coils and being extendible to a stressed condition thereof, a movable bait holder which is so mounted on the frame as to be within the coils of the spring when the spring is in said stressed condition thereof, and a linkage mechanism comprising two levers having inner ends which are pivotally interconnected, and two links each of which has a lower end pivotally connected to an outer end of a respective one of the levers and an upper end pivotally connected to the frame, the levers having support faces which are in substantially vertical alignment with the pivotal connections between the outer ends of the levers and the lower ends of the links and with which, when the spring is in said stressed condition thereof, said outer end portion of the spring is engageable, whereby to exert substantially vertically downward forces on said support faces, to retain the spring in said stressed condition thereof, and the pivotal interconnection between the inner ends of the levers being upwardly movable, with resultant inward movement of said support faces, under the influence of movement of the bait holder caused by an animal attempting to remove bait from the bait holder, for release of said outer end portion of the spring from said support faces with resultant retraction of the spring from its stressed condition during which adjacent coils of the spring between which the neck of the animal is disposed exert a shearing action on the neck of the animal to kill the animal.

7. An animal trap according to claim 6, wherein the frame comprises a base member to which said inner end portion of the spring is fixed, and a stem member on which the bait holder is freely tiltably movably mounted, a lockable pivotal connection interconnecting the base member and the stem member.

8. An animal trap according to claim 6, wherein the inner end of each of said two levers is of bifurcated form presenting two spaced limb portions, said pivotal interconnection between the inner ends of the levers being constituted by axially aligned pivotal interconnections between the limb portions of the inner end of one of the levers and the respective adjacent limb portions of the inner end of the other of the levers.

9. An animal trap according to claim 6, wherein the two levers are identical, the inner end of each of said two levers being of bifurcated form presenting two spaced limb portions, one of the limb portions of the inner end of one of the levers being disposed inwardly of an adjacent one of the limb portions of the inner end of the other of the levers with the other of the limb portions of the inner end of said one of the levers being disposed outwardly of the other of the limb portions of the inner end of said other of the levers, and said pivotal interconnection between the inner ends of the levers being constituted by axially aligned pivotal interconnections between the limb portions of the inner end of one of the levers and the respective adjacent limb portions of the inner end of the other of the levers.

10. An animal trap according to claim 8, wherein the frame comprises a stem member on which the bait holder is freely tiltably movably mounted and which is provided with a vertically elongated slot therein, said axially aligned pivotal interconnections comprising a single pivot pin which is disposed freely through said vertically elongated slot in the stem member.

11. An animal trap according to claim 8, wherein the frame comprises a stem member on which the bait holder is freely tiltably movably mounted and which is disposed between the inner ends of the levers, a portion of the stem member being upwardly tapered for guiding said inner ends of the levers during operative movement thereof.

12. An animal trap according to claim 8, wherein the frame comprises a stem member on which the bait holder is freely tiltably movably mounted, a portion of the stem member serving, in the vertical plane at right angles to the vertical plane containing the levers, as a guide for the limb portions of the inner ends of the levers during operative movement thereof.

13. An animal trap according to claim 6, wherein the frame comprises a stem member on which the bait holder is freely tiltably movably mounted, a block being slidably mounted on the stem member, and said pivotal interconnection between the inner ends of the levers being constituted by a pivotal interconnection between the inner ends of the levers and the block.

14. An animal trap according to claim 13, wherein said pivotal interconnection is constituted by spaced, parallel pivotal interconnections between the inner ends of the levers and the block.

15. An animal trap according to claim 13, wherein the inner end of each of said two levers is of bifurcated form presenting two spaced limb portions, said pivotal interconnection between the inner ends of the levers and the block being constituted by a pivotal interconnection between one of the limb portions of the inner end of one of the levers and an adjacent one of the limb portions of the inner end of the other of the levers and the block, and a further pivotal interconnection between the other of the limb portions of the inner end of said one of the levers and the adjacent other of the limb portions of the inner end of said other of the levers and the block, with said pivotal interconnections being in axial alignment.

16. An animal trap according to claim 6, wherein the support face presented by each lever is provided with ridges which extend in the direction between the inner and outer ends of said lever.

17. An animal trap according to claim 6, wherein the support face presented by each lever is inwardly bounded by an abutment.

18. An animal trap according to claim 6, wherein when the spring is in said stressed condition with the outer end portion thereof in engagement with the support faces of the levers edges of portions of the links adjacent to the support faces are substantially in alignment with the inner extremities of said support faces.

19. An animal trap according to claim 6, wherein the support face presented by each lever is concave in the direction between the inner and outer ends of said lever.

20. An animal trap according to claim 6, wherein the frame presents stop members with which the links are engageable to prevent outward movement of the support faces of the levers beyond predetermined positions.

21. An animal trap according to claim 6, wherein a cover member is mounted on the frame, the cover member comprising an upper portion which extends substantially over an upper portion of the trap, and a skirt portion which extends substantially around the upper portion of the trap from the upper portion of the cover member substantially to the level of the support faces of the levers.

* * * * *